United States Patent
Yamazoe et al.

(10) Patent No.: US 9,654,523 B2
(45) Date of Patent: May 16, 2017

(54) INFORMATION PROCESSING SYSTEM, AND NON-TRANSITORY COMPUTER READABLE MEDIUM FOR DISPLAYING ELECTRONIC STICKEY NOTES TRANSMITTED FROM A PARTICIPANT DEVICE TO A BOARD OF A SHARED DEVICE

(71) Applicant: FUJI XEROX CO., LTD., Tokyo (JP)

(72) Inventors: Nobuyuki Yamazoe, Kanagawa (JP); Kazunori Horikiri, Kanagawa (JP); Yusuke Kano, Kanagawa (JP); Yuki Nakamori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 178 days.

(21) Appl. No.: 14/274,349

(22) Filed: May 9, 2014

(65) Prior Publication Data
US 2015/0120831 A1 Apr. 30, 2015

(30) Foreign Application Priority Data
Oct. 28, 2013 (JP) .................................. 2013-222987

(51) Int. Cl.
*H04L 29/06* (2006.01)
*H04L 29/08* (2006.01)
*H04L 12/18* (2006.01)

(52) U.S. Cl.
CPC ............ *H04L 65/403* (2013.01); *H04L 67/10* (2013.01); *H04L 67/36* (2013.01);
(Continued)

(58) Field of Classification Search
CPC ....... H04L 65/403; H04L 67/10; H04L 67/36; H04L 51/046; H04L 12/1813;
(Continued)

(56) References Cited

U.S. PATENT DOCUMENTS 7,024,456 B1 * 4/2006 Simonoff ............... G06Q 10/10
709/205
7,043,529 B1 * 5/2006 Simonoff ................ H04L 67/02
709/204
(Continued)

FOREIGN PATENT DOCUMENTS

JP 2003-233556 A 8/2003
JP 2004-272473 A 9/2004
(Continued)

OTHER PUBLICATIONS

Nov. 17, 2016 Office Action issued in Japanese Patent Application No. 2013-222987.
(Continued)

*Primary Examiner* — Backhean Tiv
(74) *Attorney, Agent, or Firm* — Oliff PLC

(57) ABSTRACT

An information processing device includes a receiver, an association unit, and a controller. The receiver receives an instruction to associate one first device from among multiple first devices that display a board as well as stickies pasted onto that board with a second device that creates a sticky. The association unit associates the first device and the second device according to an instruction received by the receiver. The controller controls transmission of information related to a board and stickies pasted onto that board in the first device associated by the association unit to the second device.

14 Claims, 12 Drawing Sheets

(52) U.S. Cl.
CPC ...... *H04L 12/1813* (2013.01); *H04L 65/4015* (2013.01); *H04L 65/4038* (2013.01)

(58) Field of Classification Search
CPC . H04L 65/4015; H04L 65/4038; G06Q 50/01; G06Q 10/10; G06Q 10/101; G06Q 10/00
USPC .................................. 709/204; 715/230, 753
See application file for complete search history.

(56) References Cited

U.S. PATENT DOCUMENTS

| | | | | |
|---|---|---|---|---|
| 8,806,354 | B1* | 8/2014 | Hyndman | G06F 3/04883 709/204 |
| 2002/0016861 | A1* | 2/2002 | Simonoff | H04L 29/06 709/250 |
| 2006/0154227 | A1* | 7/2006 | Rossi | G09B 5/14 434/350 |
| 2008/0184115 | A1* | 7/2008 | Back | G06Q 10/00 715/702 |
| 2010/0070881 | A1* | 3/2010 | Hanson | G06Q 10/0631 715/753 |
| 2010/0094706 | A1* | 4/2010 | Gabai | G06Q 10/00 705/14.53 |
| 2012/0054281 | A1* | 3/2012 | Westmoreland | G06Q 10/10 709/205 |
| 2012/0124484 | A1* | 5/2012 | Robinson | G06Q 10/00 715/753 |
| 2012/0303709 | A1 | 11/2012 | Fujita et al. | |
| 2013/0091205 | A1* | 4/2013 | Kotler | H04L 65/4015 709/204 |
| 2013/0290841 | A1* | 10/2013 | Yamazoe | G06Q 10/101 715/273 |
| 2014/0337468 | A1* | 11/2014 | Horikiri | G06F 3/048 709/217 |
| 2014/0344717 | A1* | 11/2014 | Yamazoe | G06F 3/0482 715/753 |
| 2014/0351718 | A1* | 11/2014 | Nakamori | H04L 65/403 715/753 |
| 2015/0120831 | A1* | 4/2015 | Yamazoe | H04L 65/403 709/204 |
| 2015/0134737 | A1* | 5/2015 | Albrecht | H04L 12/1822 709/204 |

FOREIGN PATENT DOCUMENTS

| | | |
|---|---|---|
| JP | 2008-197765 A | 8/2008 |
| JP | A-2013-228945 | 11/2013 |
| JP | A-2012-248024 | 12/2013 |

OTHER PUBLICATIONS

Feb. 7, 2017 Office Action issued in Japanese Patent Application No. 2013-222987.

* cited by examiner

FIG. 7

| DISPLAYED STICKY INFORMATION | POSITION | SIZE | TRANSMISSION TIME | LAST TIME ASSOCIATED | OPERATION ON DISPLAY STICKY INFORMATION | LAST TIME OPERATED | SELF-INTRODUCTION STICKY |
|---|---|---|---|---|---|---|---|
| TEXT OR IMAGE | (121, 33) | (300, 100) | 03/07/2013 10:12:22:33 | 03/07/2013 10:13:13:54 | | | A |
| TEXT OR IMAGE | (121, 33) | (300, 100) | 03/07/2013 10:13:22:33 | | MOVE | 03/07/2013 10:13:28:45 | — |

710 720 730 740 750 760 770 780

700

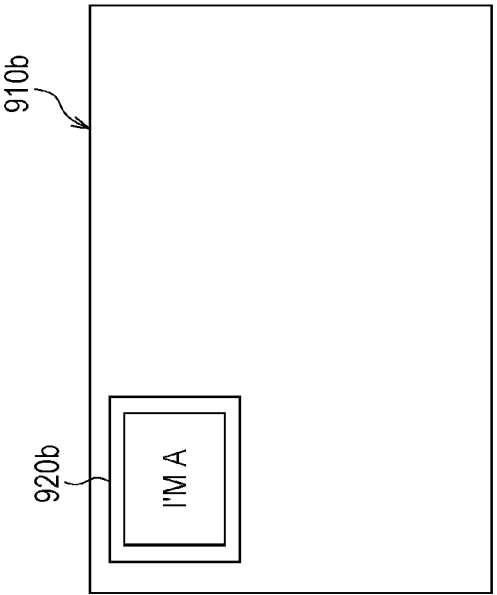
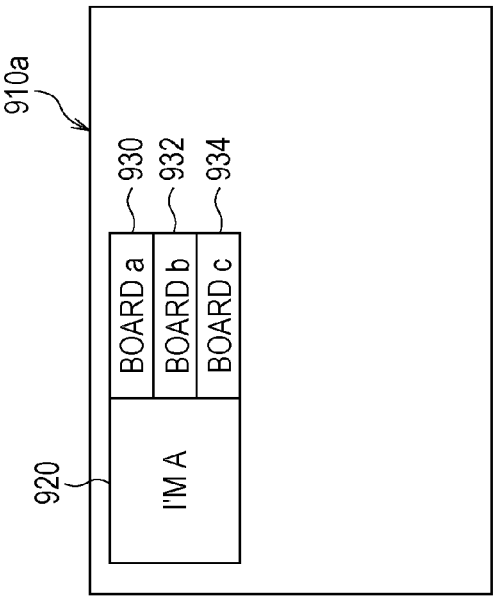
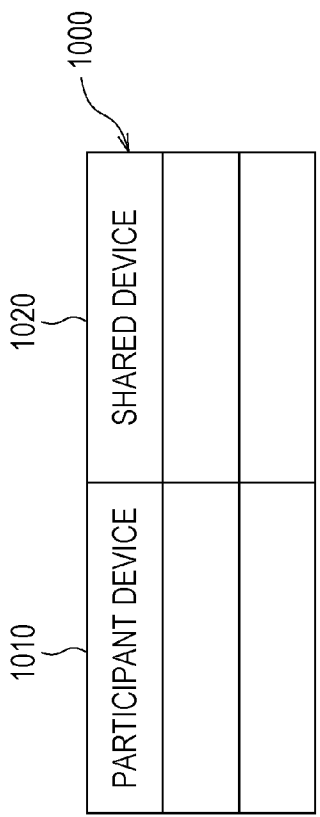

FIG. 13
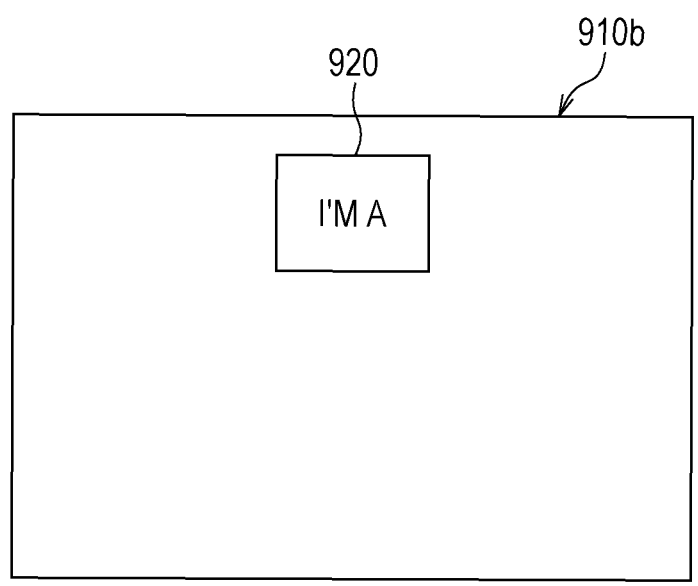
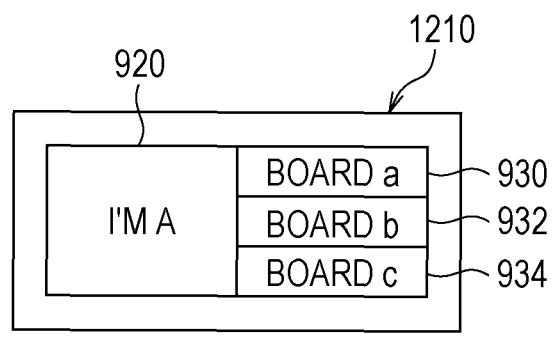

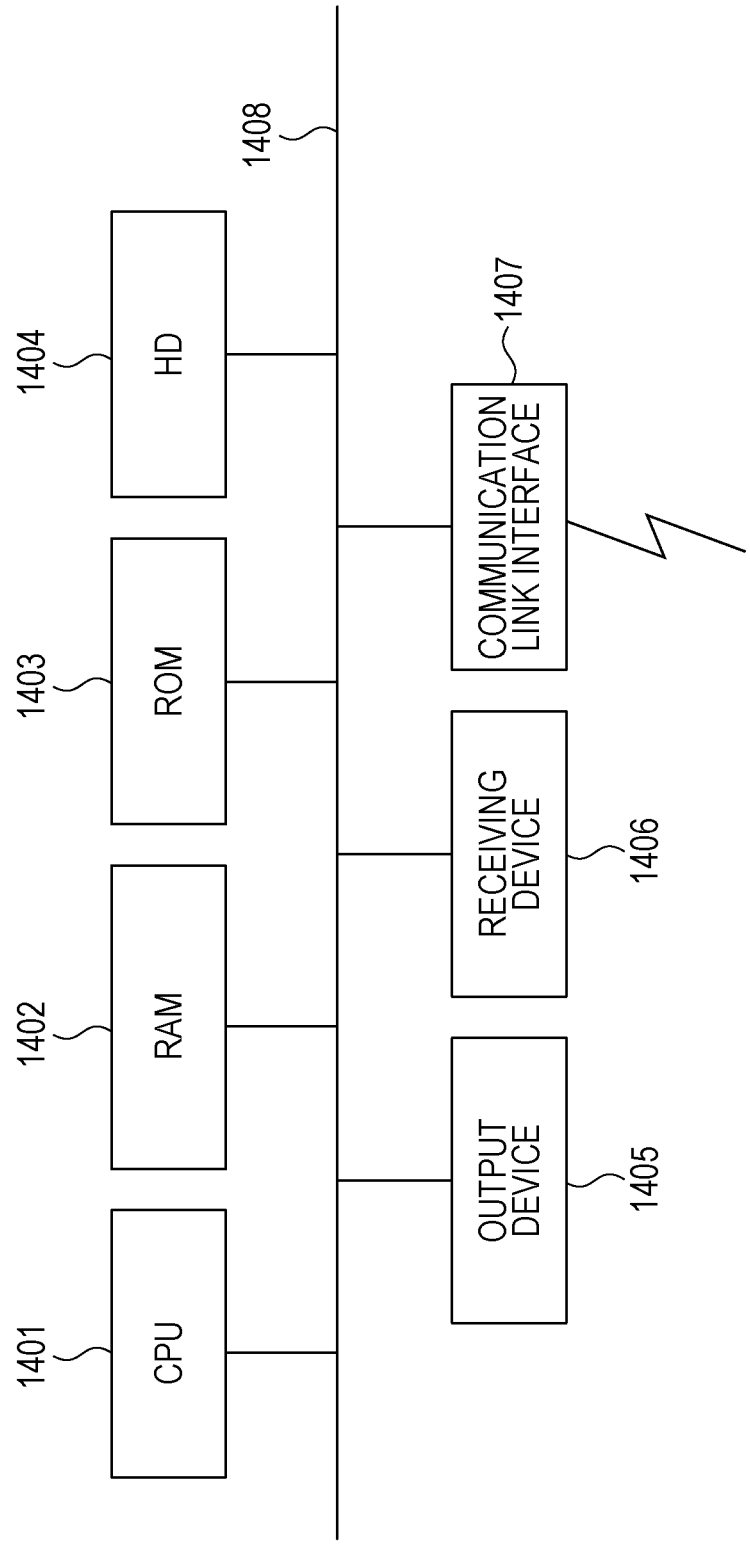

INFORMATION PROCESSING SYSTEM, AND NON-TRANSITORY COMPUTER READABLE MEDIUM FOR DISPLAYING ELECTRONIC STICKEY NOTES TRANSMITTED FROM A PARTICIPANT DEVICE TO A BOARD OF A SHARED DEVICE

CROSS-REFERENCE TO RELATED APPLICATIONS

This application is based on and claims priority under 35 USC 119 from Japanese Patent Application No. 2013-222987 filed Oct. 28, 2013.

BACKGROUND

Technical Field

The present invention relates to an information processing device, an information processing method, an information processing system, and a non-transitory computer-readable medium.

SUMMARY

According to an aspect of the invention, there is provided an information processing device that includes a receiver, an association unit, and a controller. The receiver receives an instruction to associate one first device from among multiple first devices that display a board as well as stickies pasted onto that board with a second device that creates a sticky. The association unit associates the first device and the second device according to an instruction received by the receiver. The controller controls transmission of information related to a board and stickies pasted onto that board in the first device associated by the association unit to the second device.

BRIEF DESCRIPTION OF THE DRAWINGS

An exemplary embodiment of the present invention will be described in detail based on the following figures, wherein:

FIG. 7 is an explanatory diagram illustrating an exemplary data structure of a sticky information table;

FIGS. 9A and 9B are explanatory diagrams illustrating an exemplary process according to the exemplary embodiment;

FIG. 10 is an explanatory diagram illustrating an exemplary data structure of an association table;

FIG. 13 is an explanatory diagram illustrating an exemplary process according to the exemplary embodiment; and FIG. 14 is a block diagram illustrating an exemplary hardware configuration of a computer that realizes the exemplary embodiment.

DETAILED DESCRIPTION

Hereinafter, an exemplary embodiment related to realizing the present invention will be described by way of example on the basis of the drawings.

Figure 1:
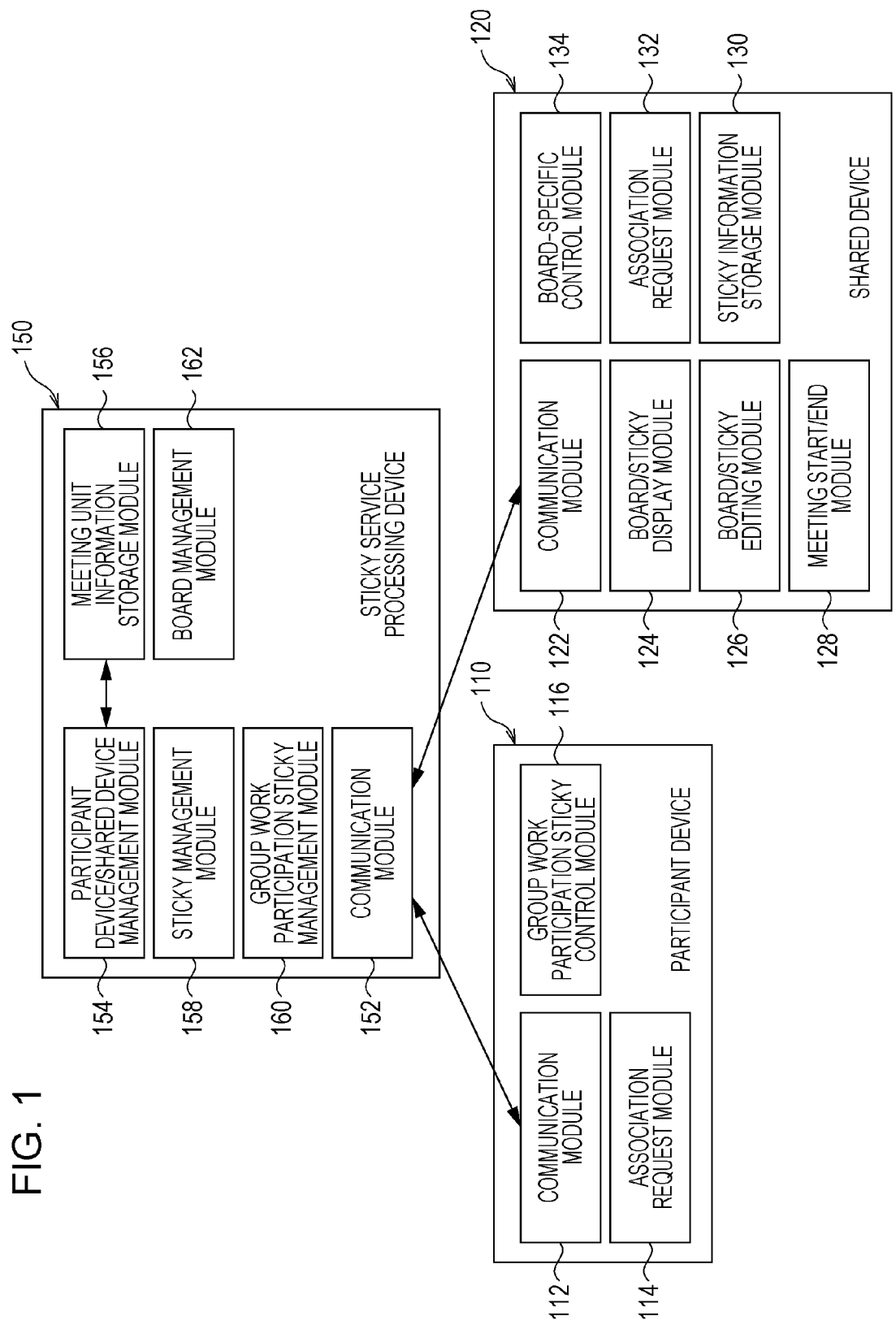
FIG. 1 is a schematic module configuration diagram for an exemplary configuration according to an exemplary embodiment.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "device" not only encompass configurations in which multiple computers, hardware, or devices are connected by a communication medium such as a network (including connections that support 1-to-1 communication), but also encompass configurations realized by a single computer, hardware, or device. The terms "device" and "system" are used interchangeably. Obviously, the term "system" does not include merely artificially arranged social constructs (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include hard disks, random access memory (RAM), an auxiliary or external storage medium, a storage device accessed via a communication link, and registers, etc. inside a central processing unit (CPU).

An information processing system according to the present exemplary embodiment pastes and displays sticky information (also called electronic sticky notes or electronic cards) transmitted from a participant device 110 on a board in a shared device 120, and as illustrated by the example of FIG. 1, includes a participant device 110, a shared device 120, and a sticky service processing device 150. A communication module 112 inside the participant device 110, a communication module 122 inside the shared device 120, and a communication module 152 inside the sticky service processing device 150 are interconnected and able to communicate with each other. In addition, although one each of the participant device 110 and the shared device 120 are illustrated in FIG. 1, generally there are multiple devices, forming multiple meeting units in nearby locations. For example, an information processing system according to the present exemplary embodiment is used in a case like the world cafe method, in which participants are split into small groups and freely talk at tables, with members occasionally being shuffled to other tables to encourage discussion. This is used as an organizational development technique to deepen mutual understanding and foster collective intelligence. According to the present exemplary embodiment, multiple shared devices 120 are installed for respective meeting units, and are used in the case in which a participant changes to another shared device 120 while carrying a participant device 110 (this corresponds to the case of participating in another meeting unit, or in the example discussed above, the case of moving to another table), or alternatively, in the case of first associating a participant device 110 with one shared device 120 from among the multiple shared devices 120 for a meeting (group work). Note that although one participant device 110 is associated with one shared device 120, one shared device 120 is associated with one or more (generally multiple) participant devices 110.

The sticky service processing device 150 includes a communication module 152, a participant device/shared device management module 154, a meeting unit information storage module 156, a sticky management module 158, a group work participation sticky management module 160, and a board management module 162.

The communication module 152 receives information transmitted from the participant device 110 and the shared device 120 (such as an association instruction, a sticky, or board-related information), and also transmits a processing result, instruction, or the like to the participant device 110 and the shared device 120.

The participant device/shared device management module 154 is connected to the meeting unit information storage module 156. The participant device/shared device management module 154 receives, via the communication module 152, an instruction to associate one shared device 120 from among multiple shared devices 120 that display a board as well as stickies pasted onto that board (a first device) with a participant device 110 that creates a sticky (a second device). The instruction may also be from any of the shared device 120 and the participant device 110. Subsequently, the participant device/shared device management module 154, following the received instruction, associates the shared device 120 with the participant device 110. The participant device/shared device management module 154 controls the transmission of information related to a board and stickies pasted onto that board in the associated shared device 120 to the participant device 110. Note that the transmission of sticky-related information to the participant device 110 is for the case of changing the shared device 120 as discussed earlier, such that if a discussion is already taking place on the associated shared device 120, the content of that discussion is transmitted to the newly associated participant device 110 to inform the user of the newly associated participant device 110 of the content of the discussion. An association result between a shared device 120 and a participant device 110 is stored in the meeting unit information storage module 156. Obviously, in the case in which the participant device 110 is already associated with a shared device 120, that association is first canceled, and then a new association is made. At this point, canceling refers to deleting data in the meeting unit information storage module 156 that stores an association between a participant device 110 and a shared device 120.

Additionally, the participant device/shared device management module 154, after associating a shared device 120 and a participant device 110, may also control the transmission of information related to a sticky created by the participant device 110 to the shared device 120.

The meeting unit information storage module 156 is connected to the participant device/shared device management module 154, and stores an association table 1000, for example. FIG. 10 is an explanatory diagram illustrating an exemplary data structure of the association table 1000. The association table 1000 includes a participant device field 1010 and a shared device field 1020. The participant device field 1010 stores a device identification (ID) able to uniquely identify a participant device 110 in the present exemplary embodiment. The shared device field 1020 stores a device ID able to uniquely identify a shared device 120 in the present exemplary embodiment.

The sticky management module 158 stores information related to a sticky created by a participant device 110 or a shared device 120, and transmits such information to a shared device 120 that includes a board onto which to paste that sticky. The sticky management module 158 also associates and stores the sticky with the ID of the participant device 110 (or a participant ID) that created that sticky.

The board management module 162 stores information related to a board created by the shared device 120, and transmits information related to that board to a participant device 110.

The group work participation sticky management module 160 stores a group work participation sticky created by a participant device 110, and transmits that sticky to a shared device 120 that includes a board onto which to paste that group work participation sticky. The group work participation sticky is also transmitted to a participant device 110 associated with the shared device 120. Herein, a group work participation sticky (hereinafter also designated an introduction sticky or self-introduction sticky) refers to a sticky including content that introduces a user using a participant device 110. For example, the group work participation sticky corresponds to the self-introduction sticky 920 discussed later using FIGS. 9A and 9B.

The participant device 110 includes a communication module 112, an association request module 114, and a group work participation sticky control module 116. Each group work participant possesses a participant device 110. The participant device 110 creates a sticky according to an operation by such a participant.

The communication module 112 receives information transmitted from the shared device 120 and the sticky service processing device 150, and also transmits a processing result, instruction, or the like to the shared device 120 and the sticky service processing device 150.

The association request module 114, according to an operation by a user of the participant device 110, carries out an instruction to associate the participant device 110 with a shared device 120. For example, the association request module 114 selectably displays shared devices 120 that may be associated with a participant device 110 near a sticky that specifies the user using that participant device 110 (for example, an introduction sticky that includes content introducing that user, or otherwise, a pre-created sticky that specifies the user; the description hereinafter takes this introduction sticky as an example). Note that an introduction sticky may also be a sticky used to join a meeting unit, and configured to be the first sticky created when joining group work. Consequently, one or more introduction stickies are created and stored in the participant device 110. Note that an introduction sticky may be created each time a participant joins a meeting unit, or an already-created introduction sticky may be used for the next meeting unit. Details of an association operation will be discussed later using the example of FIGS. 9A and 9B.

Subsequently, the communication module 152 of the sticky service processing device 150 receives an instruction to associate a shared device 120 selected by the association request module 114 with the participant device 110 of a user introduced by an introduction sticky.

In addition, the association request module 114 may also extract introduction stickies introducing the users of participant devices 110 associated with the shared device 120 associated with the participant device 110, and subsequently display a list of extracted introduction stickies. As a result, there is displayed a list of participants (participants with participating participant devices 110) in the meeting unit being held using the shared device 120 associated with that participant device 110. Details of an introduction sticky extraction/display process will be discussed later using the example of FIG. 11.

The group work participation sticky control module 116 creates an introduction sticky according to an operation by the user of the participant device 110, and also collects shared devices 120 that may be associated with the participant device 110. For example, there may be a pre-existing table storing shared devices 120 present in respective rooms, and the shared device 120 present in the room containing the participant device 110 may be collected from that table. Alternatively, wireless communication may be conducted, and a shared device 120 replying to that wireless communication may be collected. The association request module 114 uses information on the collected shared devices 120 to present a display of shared devices 120 that may be associated with the participant device 110.

The shared device 120 includes the communication module 122, a board/sticky display module 124, a board/sticky editing module 126, a meeting start/end module 128, a sticky information storage module 130, an association request module 132, and a board-specific control module 134. The shared device 120, also called a board, may be used by a facilitator, and displays a board as well as stickies pasted on that board. Stickies may also be created and edited with the shared device 120. Multiple shared devices 120 exist for respective meeting units. Participants possessing a participant device 110 (participants participating in that group work) gather around the shared device 120.

The communication module 122 receives information transmitted from the participant device 110 and the sticky service processing device 150, and also transmits a processing result, instruction, or the like to the participant device 110 and the sticky service processing device 150.

The board/sticky display module 124 displays a sticky transmitted from the participant device 110 (or the sticky service processing device 150) on a board being displayed on the shared device 120. Note that the shared device 120 may also manage multiple boards.

The board/sticky editing module 126, according to an operation by a facilitator or the like, edits a board or a sticky being displayed on the shared device 120. Editing a board may include changing the type of board (such as applying a white background, xy axes to indicate a coordinate system, a chart used for SWOT analysis, or another pattern as the background, for example). Editing a sticky may include create a new sticky itself, moving that sticky on the board, overwriting the content of the sticky (including partially deleting or adding content), picking up a sticky (an operation that selects and enlarges the display of a sticky, and sets that sticky as the current target of discussion), deleting a sticky, and the like.

The meeting start/end module 128 conducts an initialization process for starting a meeting, such as requesting the creation of an introduction sticky. In addition, the meeting start/end module 128 also conducts an ending process for ending the meeting (such as storing the state of the board and stickies at that point in time). In the case of a subsequent meeting, the meeting start/end module 128 transmits a request to associate the participant device 110 with the shared device 120 to the association request module 132.

The sticky information storage module 130 stores information related to a sticky created by a participant device 110 associated with that shared device 120 (or alternatively, information related to a sticky pasted onto a board being displayed on the shared device 120). For example, the sticky information storage module 130 stores a sticky information table 700. FIG. 7 is an explanatory diagram illustrating an exemplary data structure of the sticky information table 700. The sticky information table 700 includes a displayed sticky information field 710, a position field 720, a size field 730, a transmission time field 740, a last time associated field 750, an operation on displayed sticky information field 760, a last time operated field 770, and a self-introduction sticky field 780. The displayed sticky information field 710 stores sticky information. For example, sticky information may be text made up of character data, or image data such as a photo. The position field 720 stores the position on the board at which that sticky is displayed. The size field 730 stores the display size of that sticky. For example, in the case in which the sticky to display is a rectangle, the vertical and horizontal size may be stored. The transmission time field 740 stores the time at which that sticky was transmitted (or received). The time may be the year, month, day, hour, minute, second, fraction of a second, or some combination thereof. The last time associated field 750 stores the last time that sticky was associated with a group. The operation on displayed sticky information field 760 stores an operation performed on a displayed sticky (such as move, "pick up" as discussed earlier, or delete, for example). The last time operated field 770 stores the last time at which that operation was performed. The self-introduction sticky field 780 stores information related to an introduction sticky. For example, the self-introduction sticky field 780 may store whether or not that sticky is an introduction sticky, and in the case of an introduction sticky, store the participant (such as a participant ID) introduced by that introduction sticky.

The association request module 132, according to an operation by a user of the shared device 120 (such as a facilitator), carries out an instruction to associate the participant device 110 with the shared device 120. For example, the association request module 132 selectably displays shared devices 120 that may be associated with a participant device 110 near the introduction sticky of the user using that participant device 110. Details of an association operation will be discussed later using the example of FIGS. 9A and 9B. Note that in order to collect shared devices 120 that may be associated with a participant device 110, there may be a pre-existing table storing shared devices 120 present in respective rooms, for example, and the shared device 120 present in the room containing the participant device 110 may be collected from that table. Alternatively, the participant device 110 may conduct wireless communication, and a shared device 120 replying to that wireless communication may be collected from that participant device 110.

Subsequently, the communication module 152 of the sticky service processing device 150 receives an instruction to associate a shared device 120 selected by the association request module 132 with the participant device 110 of a user introduced by an introduction sticky.

In addition, the association request module 132 may also extract an introduction sticky introducing the user of a participant device 110 associated with that shared device 120, and subsequently display a list of extracted introduction stickies. As a result, there is displayed a list of participants in the meeting unit being held using that shared device 120. Details of an introduction sticky extraction/display process will be discussed later using the example of FIG. 11.

The board-specific control module 134 controls the size of the board, the number of stickies that may be displayed on the board on a single screen, the size of such stickies, and like, according to factors such as the size of the screen of that shared device 120.

Note that the module (function) of the sticky service processing device 150 may also be built into the shared device 120.

Figure 2:
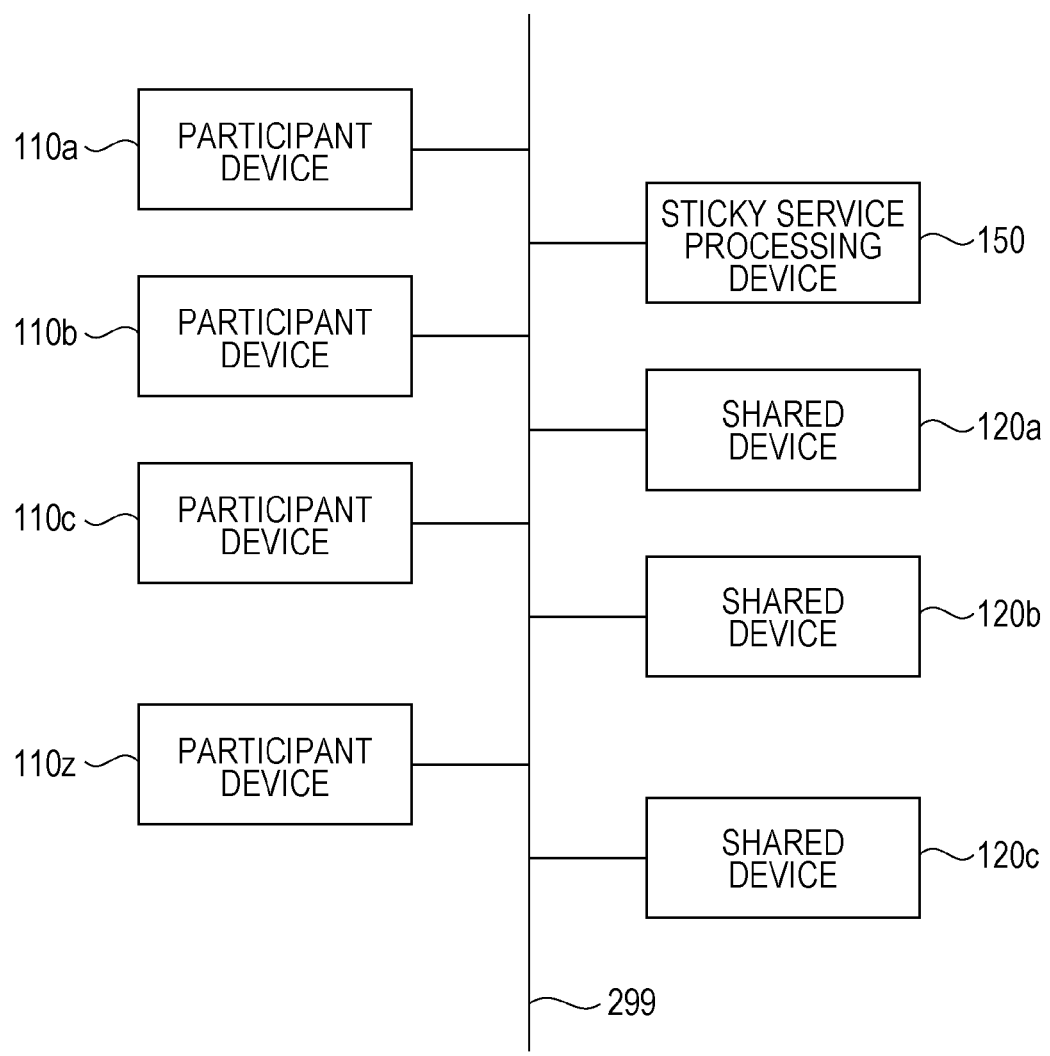
FIG. 2 is an explanatory diagram illustrating an exemplary system configuration in the case of realizing the exemplary embodiment.

FIG. 2 is an explanatory diagram illustrating an exemplary system configuration in the case of realizing the exemplary embodiment. As an example of respectively multiple participant devices 110 and shared devices 120, a participant device 110*a*, a participant device 110*b*, a participant device 110*c*, a participant device 110*d*, a participant device 110*z*, and the like are respectively connected to a shared device 120*a*, a shared device 120*b*, a shared device 120*c*, and a sticky service processing device 150 via a communication link 299. Although not all devices may be in the same room (such as a conference room), generally the participant device 110*a* and the like used by participants and the shared device 120*a* and the like used by facilitators are in the same room. The communication link 299 may be a wired link or a wireless link. Also, generally, each participant possesses one participant device 110, while a shared device 120 is operated by a facilitator. Each participant device 110 is associated with one of the shared devices 120.

Figure 3A:
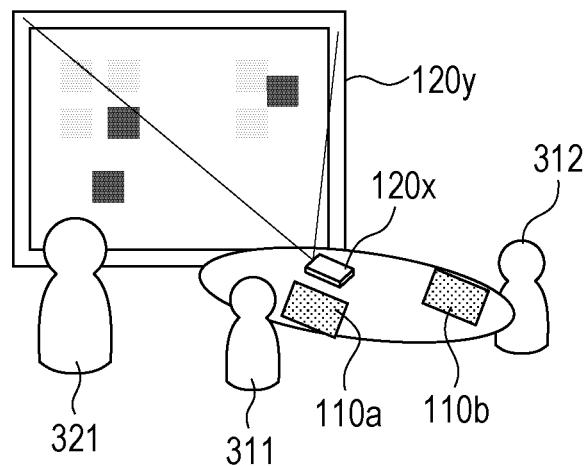
FIGS. 3A to 3C are explanatory diagrams illustrating an example of a conference room or the like used by the exemplary embodiment.
Figure 3B:
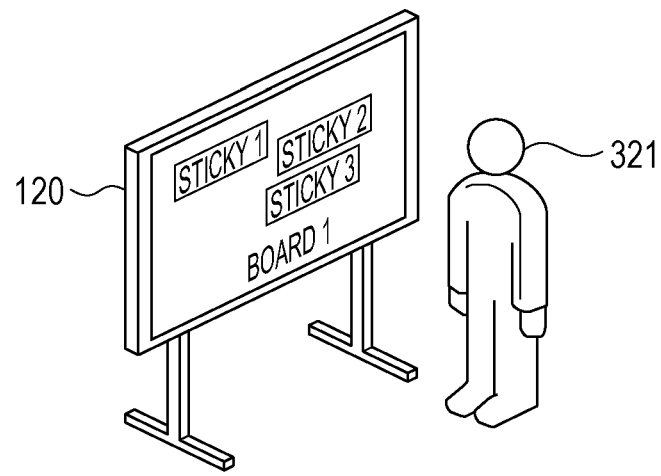
Figure 3C:
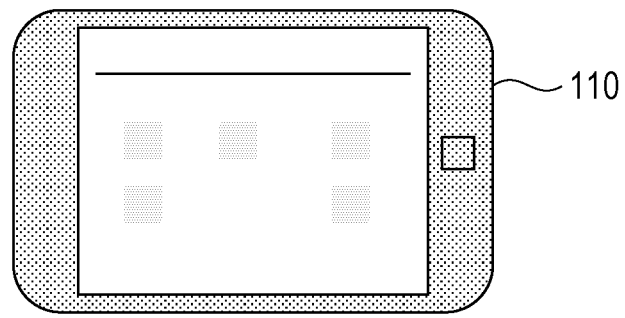

FIGS. 3A to 3C are explanatory diagrams illustrating an example of a conference room or the like used by the exemplary embodiment.

As illustrated in the example in FIG. 3A, participants 311 and 312 and a facilitator 321 are gathered in a conference room or the like. The participant 311 uses the participant device 110*a*, while the participant 312 uses the participant device 110*b*. Generally, each participant is given one client device (such as the participant device 110*a*) which, like the participant device 110 illustrated in the example of FIG. 3C, is a tablet device approximately the size of a notebook (such as A4, B5, or from 7 to 10 inches, for example), and is operated using a finger, pen, or the like. Sticky information stating text data, handwritten text, graphics, or the like is created by a participant. Note that a client device is not limited to a tablet device, and may also be a device such as a PC (including a laptop PC) equipped with a keyboard, mouse, and the like.

The shared device 120*x* illustrated in the example of FIG. 3A is a projector, and displays a board. The shared device 120*x* may also be a device equipped with a large screen (a size such as 80 inches, for example). In addition, the shared device 120*y* is an electronic whiteboard that senses the motion of a finger, pen, or the like of a facilitator 321, and receives operations such as moving a sticky, "picking up" a sticky as discussed earlier, and associating (grouping) stickies. For example, the shared device 120*y* may be equipped with a pen, and receives an operation with respect to the board and stickies by sensing that the pen has left a predetermined pen holder (that is, the facilitator 321 has picked up the pen in order to perform an operation), and by sensing the position of the pen tip (such as the pen tip touching the shared device 120*y*). For example, a sensor may be provided in the pen holder (such as a sensor in which a switch turns on/off by the weight of a pen), and may sense which pen from among multiple pens (such as a black pen, a red pen, and a blue pen) is being used. Also, the entire display screen of the shared device 120*y* may be a touch sensor, and may sense touched positions and pressures on the display screen.

In addition, the shared device 120 may also be an electronic board as illustrated in the example of FIG. 3B. The electronic board generally includes a large-screen display device (at least larger than a display device of a participant device 110). The display device is a touch panel, and senses touched positions and pressures on the display screen.

Figure 4:
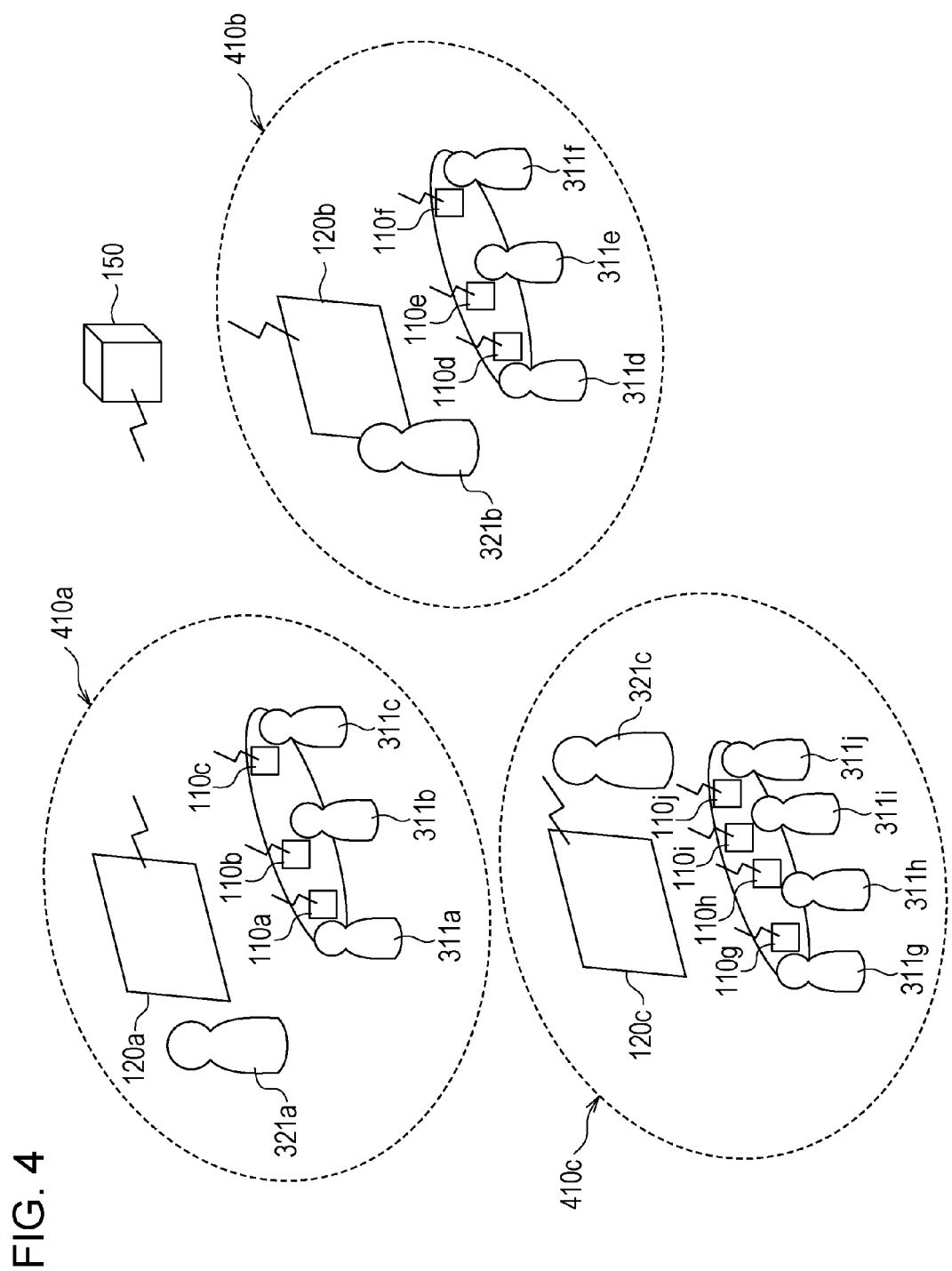
FIG. 4 is an explanatory diagram illustrating an example of a conference room or the like used by the exemplary embodiment.

FIG. 4 is an explanatory diagram illustrating an example of a conference room or the like used by the exemplary embodiment.

Inside a meeting unit area 410*a*, a shared device 120*a*, a participant device 110*a*, a participant device 110*b*, a participant device 110*c*, and a sticky service processing device 150 are interconnected by wireless communication. Inside a meeting unit area 410*b*, a shared device 120*b*, a participant device 110*d*, a participant device 110*e*, a participant device 110*f*, and a sticky service processing device 150 are interconnected by wireless communication. Inside a meeting unit area 410*c*, a shared device 120*c*, a participant device 110*g*, a participant device 110*h*, a participant device 110*i*, a participant device 110*j*, and a sticky service processing device 150 are interconnected by wireless communication. Note that the shared devices 120*a* to 120*c* and the participant devices 110*a* to 110*j* exist in a state of being able to wirelessly communicate with each other.

Under such conditions, participants in each meeting unit may be shuffled. For example, the participant 311*a* may be swapped with the participant 311*d* (a 1-to-1 swap), the participant 311*b* may be swapped with the participant 311*g* and the participant 311*h* (a 1-to-n swap), or some other n-to-m swap may be conducted. In this case, the participant devices 110 and the shared devices 120 are associated. Note that association may also be conducted in the case of first setting up a meeting unit.

Note that in the example of FIG. 4, a single meeting unit may also include multiple shared devices 120. If a member is swapped (such as the participant 311*a*) during a meeting similarly to the world cafe method discussed earlier, the present exemplary embodiment is used to re-associate the participant device 110 possessed by that member with the shared device 120 to be joined.

Figure 5:
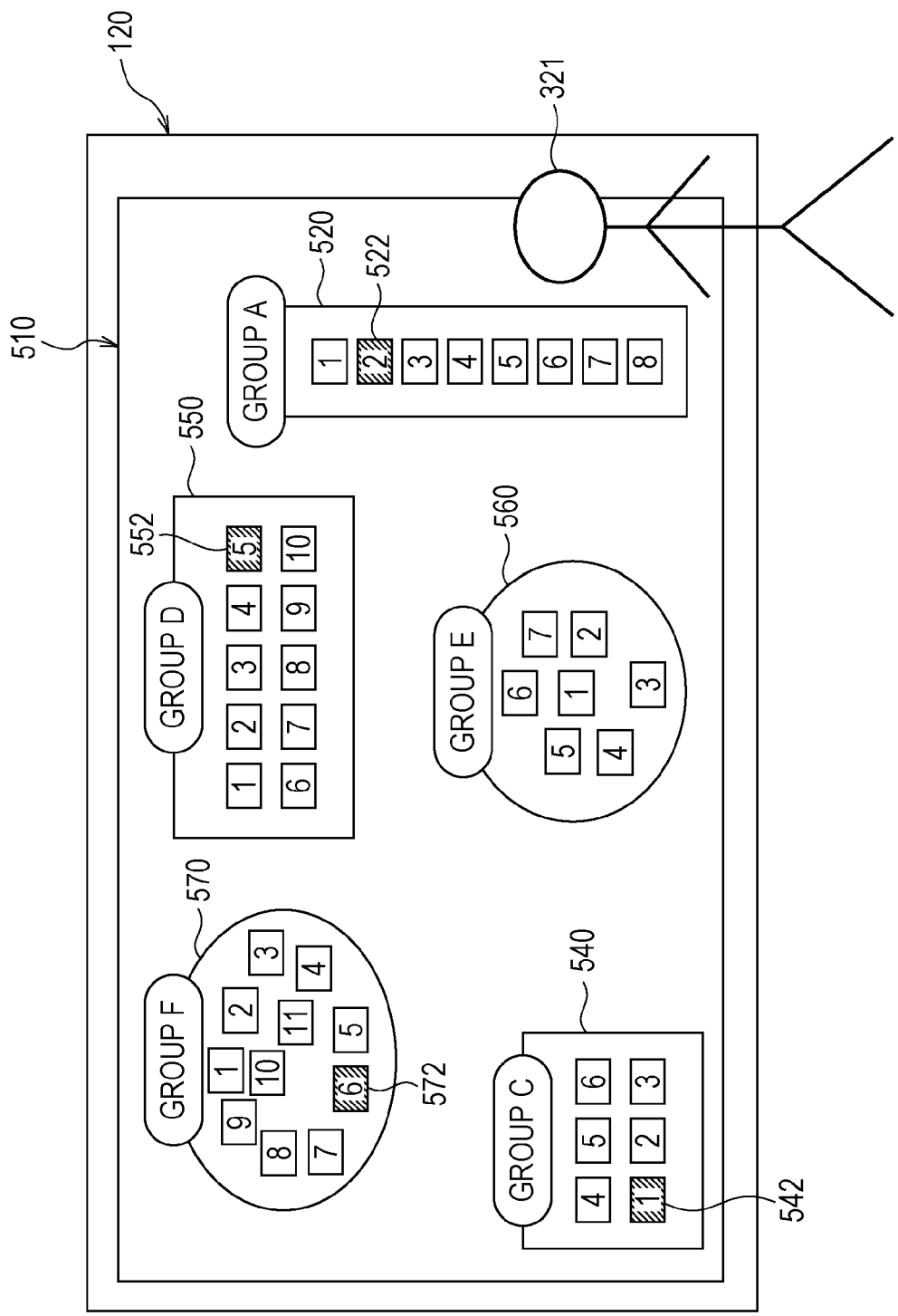
FIG. 5 is an explanatory diagram illustrating an exemplary display of a shared device according to the exemplary embodiment.

FIG. 5 is an explanatory diagram illustrating an exemplary display of a shared device 120 according to the exemplary embodiment. The screen of the shared device 120 illustrated in the example of FIG. 5 is that which is displayed on the shared device 120*y* or the shared device 120 illustrated in the examples of FIGS. 3A and 3B.

The shared device 120 includes a board area 510. Inside the board area 510, besides general stickies (the small rectangles in FIG. 5), there are displayed a group area A 520, a group area C 540, a group area D 550, a group area E 560, and a group area F 570 in which the stickies are associated. Additionally, a sticky is moved inside the board area 510 according to an operation by the facilitator 321 who is a participant (such as moving to another group, for example).

Note that the method of forming groups may also involve sensing an explicit operation, such as the facilitator 321 drawing the frame of the group area A 520, and putting stickies within that frame into the same group. Alternatively, the method of forming groups may involve sensing an area produced by moving stickies in which the presence of stickies is at least a predetermined value or of greater density, and putting stickies in that area into the same group.

The stickies pasted onto the board area 510 include the introduction sticky discussed earlier.

Figure 6:
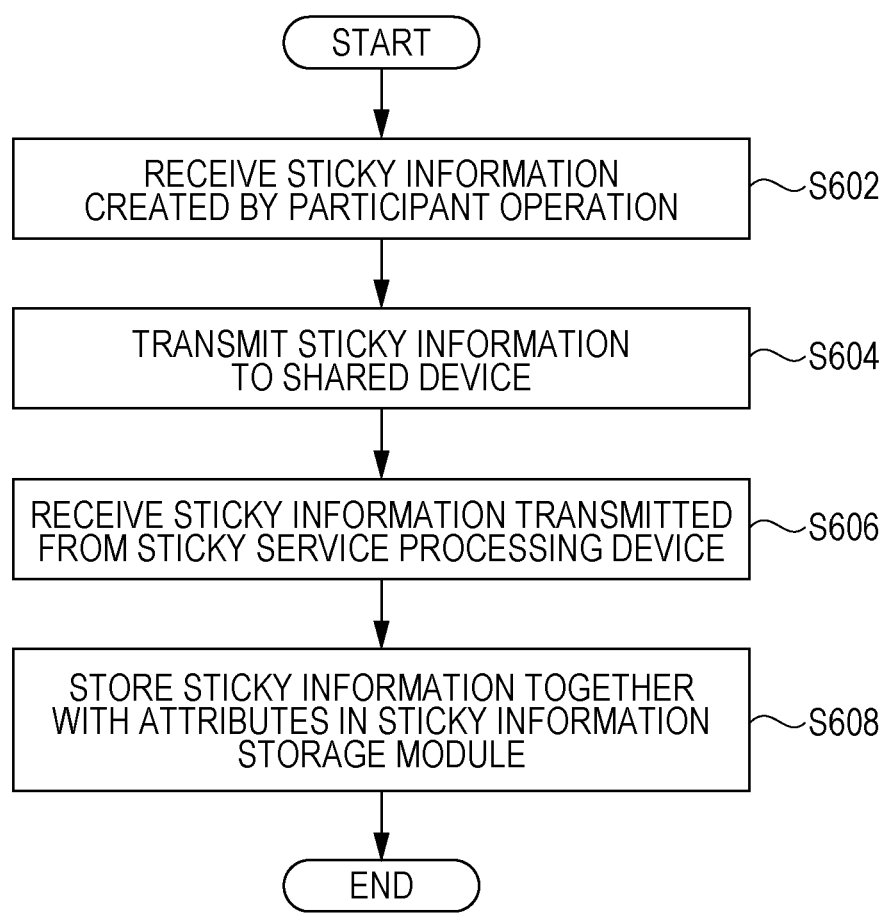
FIG. 6 is a flowchart illustrating an exemplary process according to the exemplary embodiment.

FIG. 6 is a flowchart illustrating an exemplary process according to the exemplary embodiment.

In step S602, the sticky service processing device 150 receives sticky information created by the participant device 110 with a participant operation.

In step S604, the communication module 152 of the sticky service processing device 150 transmits sticky information to the shared device 120.

In step S606, the communication module 122 of the shared device 120 receives the sticky information transmitted from the sticky service processing device 150.

In step S608, the sticky information storage module 130 of the shared device 120 stores the sticky information together with attributes (such as a creator ID indicating the creator, and a creation time) in the sticky information storage module 130.

Figure 8:
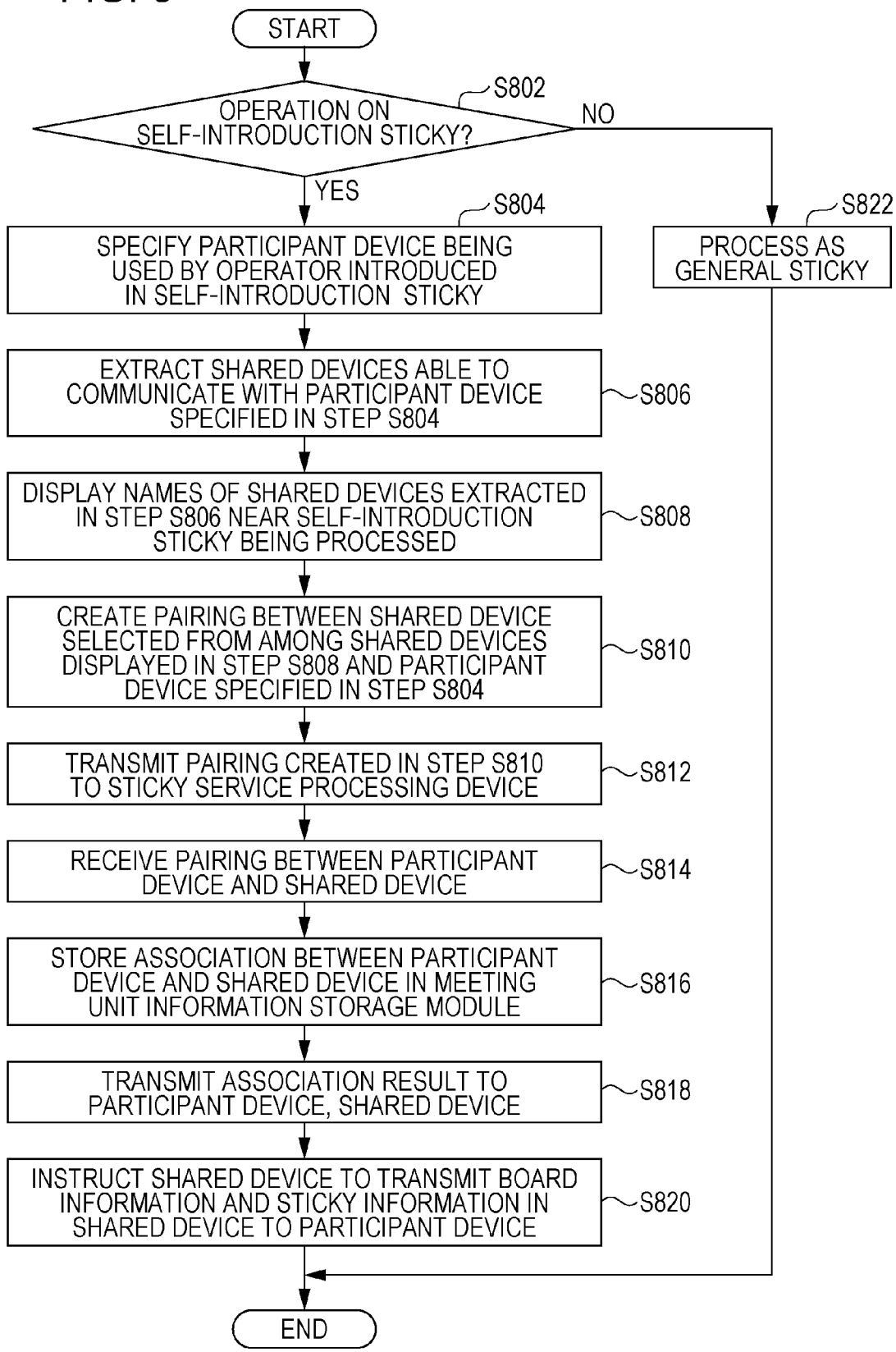
FIG. 8 is a flowchart illustrating an exemplary process according to the exemplary embodiment.

FIG. 8 is a flowchart illustrating an exemplary process according to the exemplary embodiment. This process is conducted by the association request module 114 and the group work participation sticky control module 116 in the case of being conducted by the participant device 110, and is conducted by the association request module 132 in the case of being conducted by the shared device 120.

In step S802, it is determined whether or not an operation is performed on a self-introduction sticky. If an operation performed on a self-introduction sticky, the process proceeds to step S804, otherwise the process proceeds to step S822. The determination of whether or not the operated sticky is a self-introduction sticky may be made by checking the self-introduction sticky field 780 of the sticky information table 700, for example.

In step S804, the participant device 110 being used by the operator introduced by that self-introduction sticky is specified. In the case in which the process is being conducted by a participant device 110, it is sufficient to specify that participant device 110. In the case in which the process is being conducted by the shared device 120, it is sufficient to extract the ID of the participant device 110 associated with the creator ID of that sticky.

In step S806, shared devices 120 able to communicate with the participant device 110 specified in step S804 are extracted. As discussed earlier, these may be predetermined shared devices 120, or the participant device 110 may conduct wireless communication and extract the shared devices 120 that reply.

In step S808, names of the shared devices 120 extracted in step S806 are displayed near the self-introduction sticky being processed. For example, as illustrated in FIG. 9A, an associable board 930, an associable board 932, and an associable board 934, which are the names of groups of shared devices 120, are displayed near a self-introduction sticky 920 pasted onto a board 910*a* of a shared device 120*a*.

In step S810, a pairing is created between a shared device 120 selected by an operator operation from among the shared devices 120 displayed in step S808, and the participant device 110 specified in step S804.

In step S812, the pairing created in step S810 is transmitted to the sticky service processing device 150.

In step S814, the participant device/shared device management module 154 of the sticky service processing device 150 receives the pairing of the participant device 110 and the shared device 120.

In step S816, the participant device/shared device management module 154 stores an association between the participant device 110 and the shared device 120 in the meeting unit information storage module 156. For example, the association table 1000 discussed earlier is created.

In step S818, the participant device/shared device management module 154 transmits an association result to the participant device 110 and the shared device 120. Subsequently, in the case in which the associable board 932 is selected, in the shared device 120 that corresponds to the associable board 932, a self-introduction sticky 920*b* on a board 910*b* of a shared device 120*b* is displayed, as illustrated by the example of FIG. 9B. This self-introduction sticky 920*b* may also be displayed as a sticky that differs from a general sticky, such as by being displayed with a double-lined frame, for example. Note that in accordance with the association, the self-introduction sticky 920 may be deleted from the board 910*a* of the shared device 120*a*, or remain pasted onto the board 910*a*. For example, it may be determined whether or not that meeting unit has ended. If ended, the self-introduction sticky 920 may remain pasted onto the board 910*a*. If that meeting unit has not ended, the self-introduction sticky 920 may be removed from the display of the board 910*a* of the shared device 120*a*, but still recorded as a person who participated up until the time at which the association process was conducted. In addition, the associating shared device 120 may include multiple boards, and the associated participant device 110 may be associated with a predetermined board from among those multiple boards. In the case in which the shared device 120 includes multiple boards, specifying which board to associate with may also become cumbersome. Accordingly, in the present exemplary embodiment, one board from among the multiple boards is set as the association target. Note that the predetermined board may be the board being displayed by the shared device 120 when the association is conducted. Alternatively, the boards may be ordered, and the predetermined board may be the Nth board.

In step S820, the participant device/shared device management module 154 instructs the shared device 120 to transmit board information and sticky information in the shared device 120 to the participant device 110. For example, in the case of changing the shared device 120, if a discussion is already taking place on the associated shared device 120, the content of that discussion is transmitted to the newly associated participant device 110 to inform the user of the newly associated participant device 110 of the content of the discussion. Additionally, after that, in the previous example, information related to the board 910*b* of the shared device 120*b* and the stickies pasted onto the board 910*b* is transmitted to the participant device 110*a* (the participant device 110 being operated by A). Obviously, thereafter, stickies created by the participant device 110*a* are transmitted to the shared device 120*b*.

In step S822, the sticky is processed as a general sticky.

Figure 11:
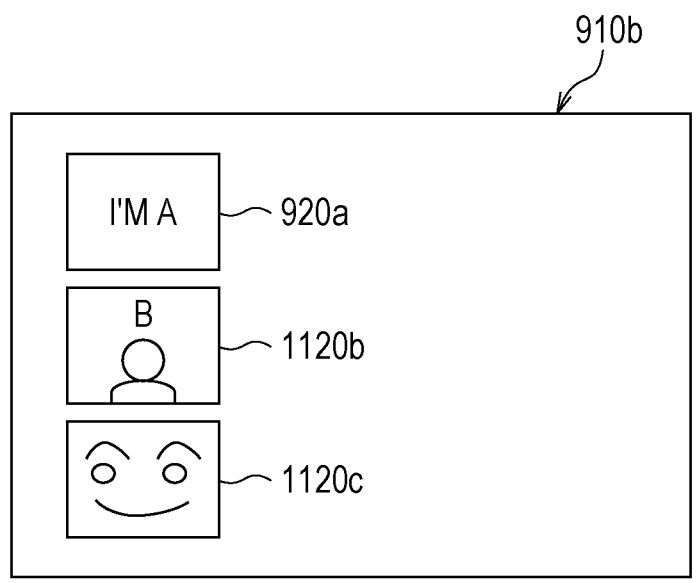
FIG. 11 is an explanatory diagram illustrating an exemplary process according to the exemplary embodiment.

FIG. 11 is an explanatory diagram illustrating an exemplary process according to the exemplary embodiment. On the participant device 110 or the shared device 120, there is displayed a list of introduction stickies of participants with participant devices 110 associated with that shared device 120. In other words, extracting just the self-introduction stickies pasted onto the board of a shared device 120 demonstrates who is attached to which shared device 120. For example, the self-introduction sticky 920*a*, the self-introduction sticky 1120*b*, and the self-introduction sticky 1120*c* of each participant are displayed on the board 910*b* of the shared device 120*b*.

Figure 12:
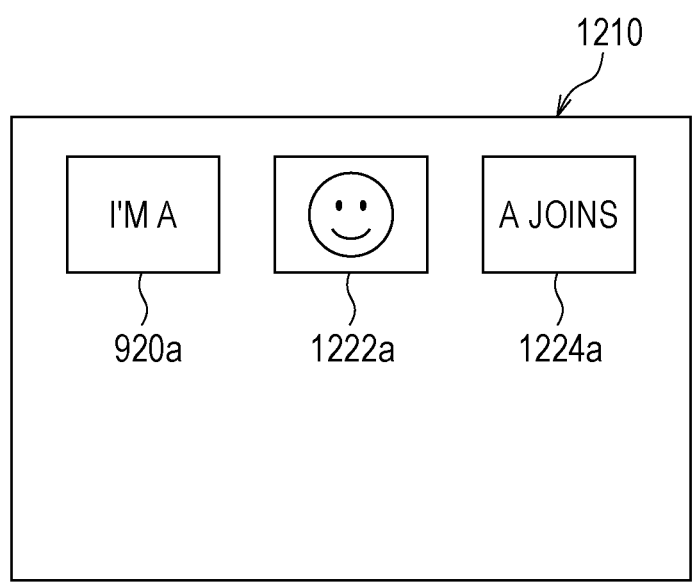
FIG. 12 is an explanatory diagram illustrating an exemplary process according to the exemplary embodiment.

FIG. 12 is an explanatory diagram illustrating an exemplary process according to the exemplary embodiment. Inside a participant device 110, an introduction sticky created for each meeting unit may be stored. A participant may then select his or her own introduction sticky from among the stored introduction stickies, and use the selected introduction sticky in a new meeting unit. For example, a previously created self-introduction sticky 920*a*, self-introduction sticky 1222*a*, and self-introduction sticky 1224*a* are displayed on a screen 1210 of a participant device 110*a*.

FIG. 13 is an explanatory diagram illustrating an exemplary process according to the exemplary embodiment. Although an association instruction is carried out on the shared device 120 side in the example of FIG. 9, an association instruction may also be carried out on the participant device 110 side.

For example, an associable board 930, an associable board 932, and an associable board 934 may be displayed near a self-introduction sticky 920 pasted onto a screen 1210 of a participant device 110*a*. In this case, an association reflects the intention of the participant using the participant device 110. Subsequently, in the case in which the associable board 932 is selected, the self-introduction sticky 920 is displayed on a board 910*b* of a shared device 120*b*. Additionally, after that, information related to the board 910*b* of the shared device 120*b* and the stickies pasted onto the board 910*b* is transmitted to the participant device 110*a*. Obviously, thereafter, stickies created by the participant device 110*a* are transmitted to the shared device 120*b*.

Note that a hardware configuration of a computer executing a program that acts as the present exemplary embodiment is a general computer as illustrated by the example of FIG. 14, and specifically is a computer or the like that may be a personal computer or a server. In other words, as a specific example, a CPU 1401 is used as a processing unit (computational unit), while RAM 1402, ROM 1403, and an HD 1404 are used as storage devices. For the HD 1404, a hard disk may be used, for example. The computer is made up of the CPU 1401 that executes programs such as the communication module 112, the association request module 114, the group work participation sticky control module 116, the communication module 122, the board/sticky display module 124, the board/sticky editing module 126, the meeting start/end module 128, the sticky information storage module 130, the association request module 132, the board-specific control module 134, the communication module 152, the participant device/shared device management module 154, the meeting unit information storage module 156, the sticky management module 158, the group work participation sticky management module 160, and the board management module 162, the RAM 1402 that stores such programs and data, the ROM 1403 that stores programs and the like for activating the computer, the HD 1404 which is an auxiliary storage device (and which may be flash memory or the like), a receiving device 1406 that receives data on the basis of user operations with respect to a keyboard, mouse, touch panel, or the like, an output device 1405 such as a CRT or liquid crystal display, a communication link interface 1407 such as a network interface card for connecting to a communication network, and a bus 1408 for joining and exchanging data with the above components. Multiple such computers may also be connected to each other by a network.

Of the foregoing exemplary embodiments, for those made up of a computer program, software in the form of a computer program is made to be read into a system with the above hardware configuration, and the foregoing exemplary embodiment is realized by the cooperative action of the software and hardware resources.

Note that the hardware configuration illustrated in FIG. 14 illustrates a single exemplary configuration, and that the exemplary embodiment is not limited to the configuration illustrated in FIG. 14 insofar as the configuration still enables execution of the modules described in the exemplary embodiment. For example, some modules may also be realized with special-purpose hardware (such as an ASIC, for example), and some modules may be configured to reside within an external system and be connected via a communication link. Furthermore, it may also be configured such that multiple instances of the system illustrated in FIG. 14 are connected to each other by a communication link and operate in conjunction with each other. Additionally, besides a personal computer in particular, an exemplary embodiment may also be incorporated into a device such as an information appliance, photocopier, fax machine, scanner, printer, or multi-function device (that is, an image processing device having two or more from among scanning, printing, copying, and faxing functions).

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

Potential examples of a recording medium include a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), and a Secure Digital (SD) memory card.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), an internet, an intranet, an extranet, or some combination thereof, or alternatively, by being impressed onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a receiver that receives an instruction to associate one first device from among a plurality of first devices that display a board as well as stickies pasted onto that board with a second device that creates a sticky;
a processor configured to act as an association unit that associates the first device and the second device according to the instruction received by the receiver; and
a controller that controls transmission of information related to a board and stickies pasted onto that board in the first device associated by the association unit to the second device,
wherein the receiver receives the instruction to associate the first device and the second device when the first device is selected by a user of the second device during transmission of a sticky for self-introduction of the second device, the sticky for self-introduction being transmitted from the second device by the user.

2. An information processing system comprising:
the first device or the second device and the information processing device according to claim 1;
wherein the first device or the second device includes
a processor configured to act as a selection and display unit that selectably displays first devices that may be associated with a second device near a sticky that specifies a user using that second device, and
the receiver receives an instruction to associate a first device selected by the selection and display unit with a second device according to the sticky that specifies a user.

3. The information processing system according to claim 2, wherein the first device includes
an extractor that extracts stickies specifying users of second devices associated with the first device, and
a display that displays a list of stickies extracted by the extractor.

4. The information processing system according to claim 3, wherein the second device includes
an extractor that extracts stickies specifying users of second devices associated with a first device associated with the second device, and
a display that displays a list of stickies extracted by the extractor.

5. The information processing system according to claim 2, wherein the second device includes
an extractor that extracts stickies specifying users of second devices associated with a first device associated with the second device, and
a display that displays a list of stickies extracted by the extractor.

6. An information processing system comprising:
the first device or the second device and the information processing device according to claim 1;
wherein the first device includes a plurality of boards, and associates a predetermined board from among the boards with the associated second device.

7. The information processing system according to claim 6, wherein the first device includes
an extractor that extracts stickies specifying users of second devices associated with the first device, and
a display that displays a list of stickies extracted by the extractor.

8. The information processing system according to claim 7, wherein the second device includes
an extractor that extracts stickies specifying users of second devices associated with a first device associated with the second device, and
a display that displays a list of stickies extracted by the extractor.

9. The information processing system according to claim 6, wherein the second device includes
an extractor that extracts stickies specifying users of second devices associated with a first device associated with the second device, and
a display that displays a list of stickies extracted by the extractor.

10. The information processing system according to claim 1, wherein
the association unit associates the stickies into groups of stickies that are displayed on the board, and the groups of stickies are formed based on a determination of an area having a number of stickies exceeding a predetermined value, and putting stickies in that area into a same group.

11. An information processing method comprising:

receiving an instruction to associate one first device from among a plurality of first devices that display a board as well as stickies pasted onto that board with a second device that creates a sticky;

associating the first device and the second device according to a received instruction;

controlling transmission of information related to a board and stickies pasted onto that board in the associated first device to the second device; and receiving the instruction to associate the first device and the second device when the first device is selected by a user of the second device during transmission of a sticky for self-introduction of the second device, the sticky for self-introduction being transmitted from the second device by the user.

12. The information processing method according to claim 11, further comprising:

associating the stickies into groups of stickies that are displayed on the board, wherein the groups of stickies are formed based on a determination of an area having a number of stickies exceeding a predetermined value, and putting stickies in that area into a same group.

13. A non-transitory computer readable medium storing a program causing a computer to execute a process for processing information, the process comprising:

receiving an instruction to associate one first device from among a plurality of first devices that display a board as well as stickies pasted onto that board with a second device that creates a sticky;

associating the first device and the second device according to a received instruction;

controlling transmission of information related to a board and stickies pasted onto that board in the associated first device to the second device; and receiving the instruction to associate the first device and the second device when the first device is selected by a user of the second device during transmission of a sticky for self-introduction of the second device, the sticky for self-introduction being transmitted from the second device by the user.

14. The non-transitory computer readable medium according to claim 13, the process further comprising:

associating the stickies into groups of stickies that are displayed on the board, wherein the groups of stickies are formed based on a determination of an area having a number of stickies exceeding a predetermined value, and putting stickies in that area into a same group.

* * * * *